Dec. 17, 1940.   L. HARTMAN   2,225,560
FIGURE FORMED MULTICYCLE VEHICLE
Filed April 26, 1939   3 Sheets-Sheet 3
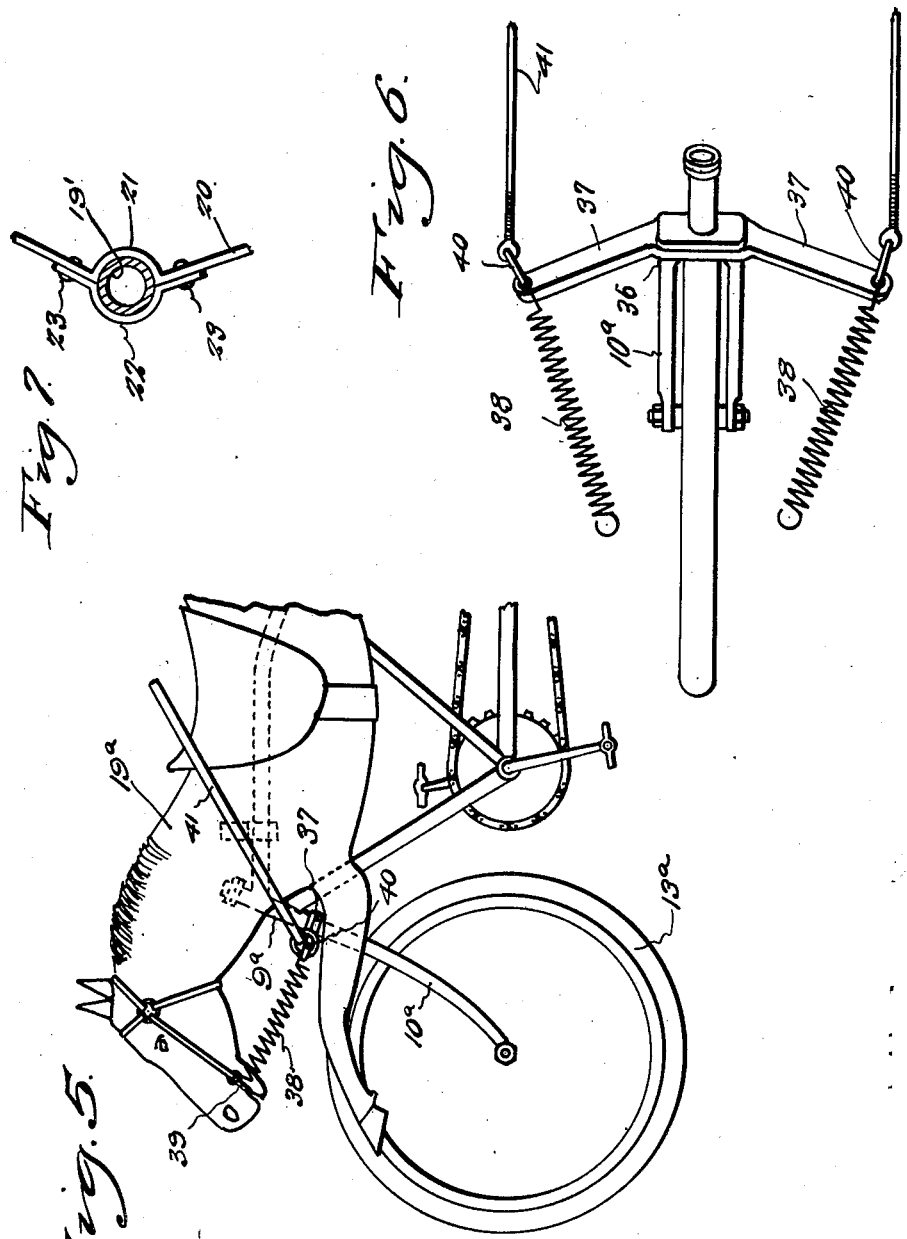
Inventor
Lafayette Hartman
By Clarence A. O'Brien
and Hyman Berman
Attorneys Patented Dec. 17, 1940

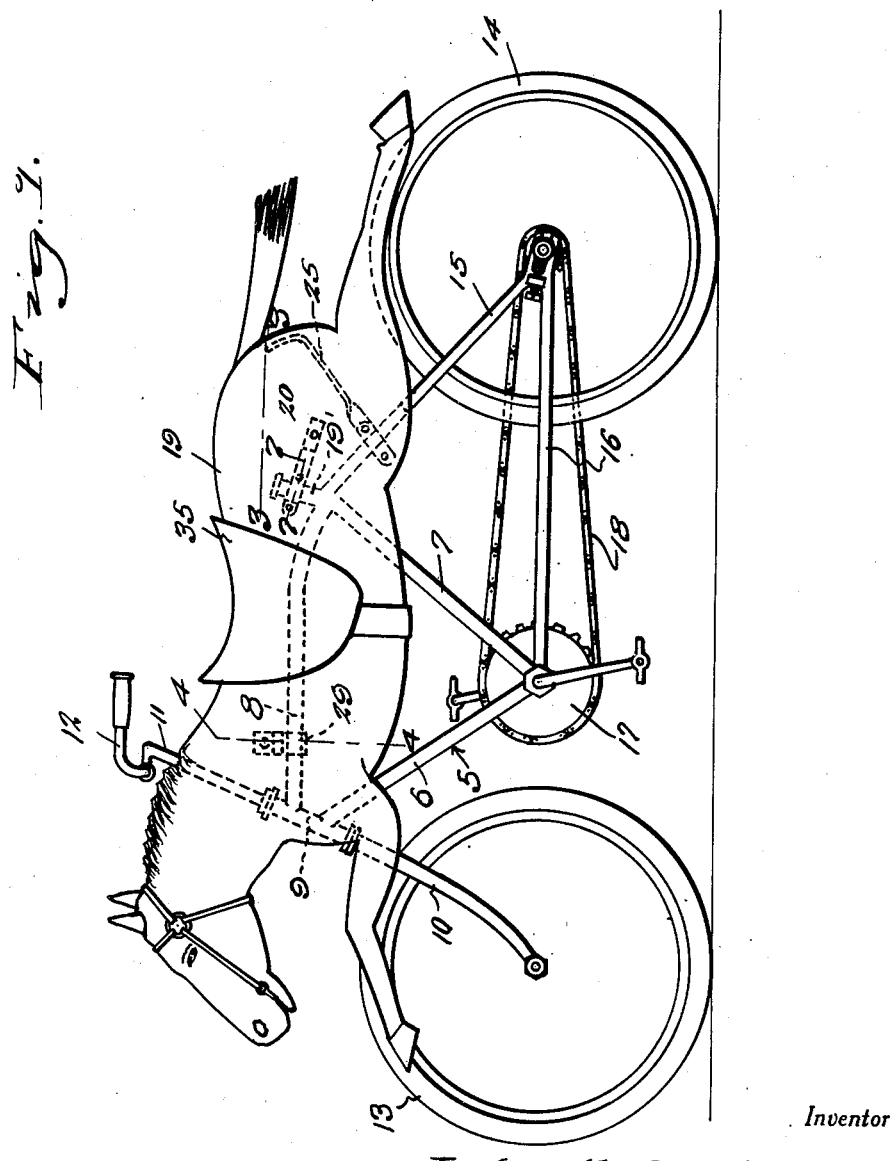

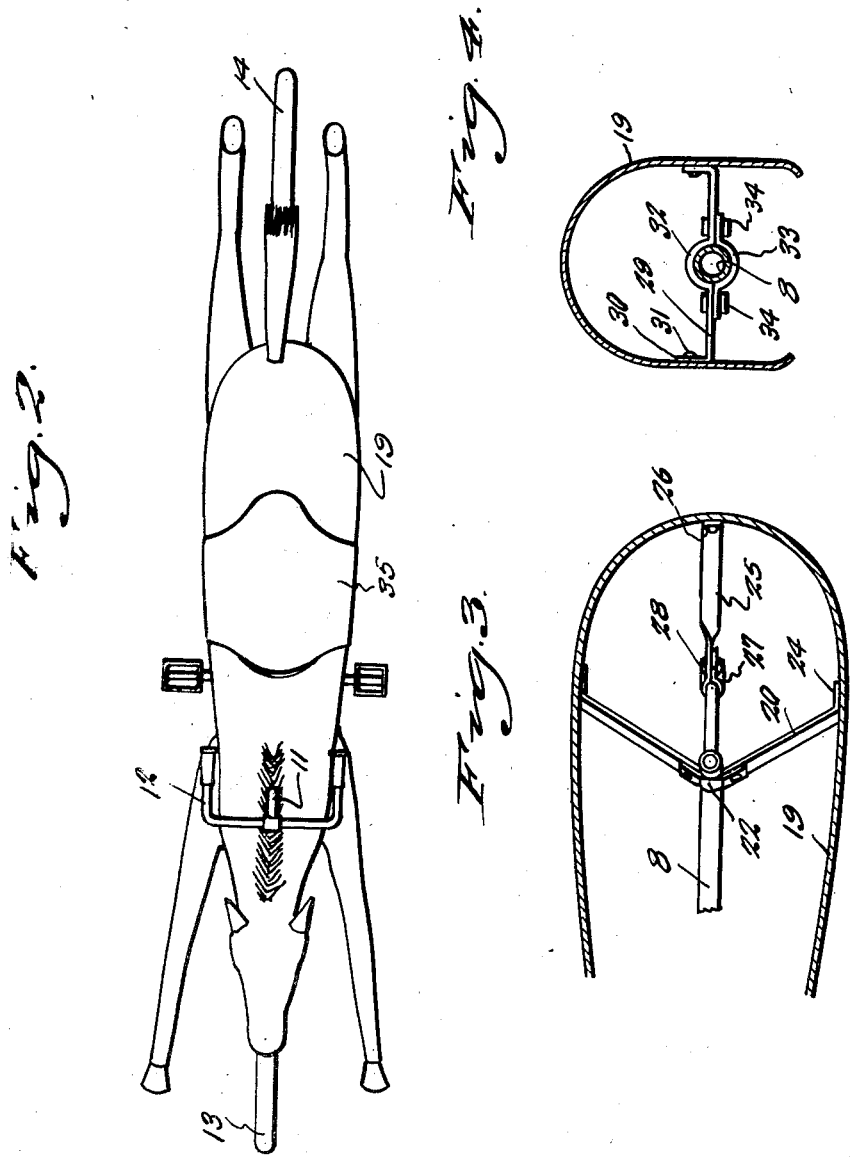

2,225,560

UNITED STATES PATENT OFFICE 2,225,560

FIGURE FORMED MULTICYCLE VEHICLE

Lafayette Hartman, Bradley, Ill.

Application April 26, 1939, Serial No. 270,239

2 Claims. (Cl. 280—1.13)

The invention appertains to new and useful improvements in multicycle vehicles such as bicycles and tricycles and more particularly to a vehicle of this character which has a figure formed body such as that of a horse or other animal.

The principal object of the present invention is to provide a vehicle especially intended for use by children as a cycling vehicle which will simulate some form of animal and which in use will be highly exciting and amusing both to the users and to observers.

Other objects and advantages of the invention will become apparent to the reader of the following specification.

In the drawings—

Figure 1 represents a side elevational view.

Figure 2 is a top plan view.

Figure 3 is a section on the line 3—3 of Figure 1.

Figure 4 is a section on the line 4—4 of Figure 1.

Figure 5 is a fragmentary side elevational view of slightly modified form of the invention.

Figure 6 is a fragmentary top plan view with parts removed showing the steering means of the form of the invention disclosed in Figure 5.

Figure 7 is a fragmentary detailed sectional view on the line 7—7 of Figure 1.

Referring to the drawings wherein like numerals designate like parts, it can be seen that numeral 5 generally refers to a bicycle construction of generally conventional shape the same consisting of the upwardly diverging frame members 6—7 and the horizontal bar 8. The bar 8 and frame member 6 joining the barrel 9 in which the shank of the fork 10 is journalled and to which is secured the shank 11 of the handle bars 12. Numeral 13 represents the front wheel which is carried by the fork 10 while numeral 14 is the rear wheel which is mounted between the tail members 15 and 16 of the vehicle frame. Numeral 17 represents the drive sprocket and numeral 18 is the sprocket chain which is trained over the sprocket wheel 17 and the small sprocket on the rear wheel 14.

Numeral 19' denotes the usual stub which rises from the upper portion of the frame and on which ordinarily the usual bicycle seat is secured.

Numeral 19 represents a body of hollow construction and in the form of a horse. A brace strap 20 is disposed horizontally in the body 19 between the side portions thereof, the intermediate portion of this strap having the arcuate shaped recession 21 for receiving a portion of the stub 19. A short stub member 22 is formed with an arcuate portion for receiving the remaining portion of the stub 19' and is secured by suitable means 23—23 to the strap 20. As can be seen in Figure 3, the ends of the strap 20 are bent laterally as at 24 and suitably secured to the inner surfaces of the side walls of the body 19.

Another strap 25 has one end bent laterally and secured as at 26 to the rear end of the body 19 and extends downwardly to the tail bar 15. A clamp plate 27 has suitable securing means 28 employed for securing the strap 25 to the tail bar 15.

At the forward end portion of the horizontal frame 8 is the cross strap 29 which has its ends bent laterally as at 30 and secured by suitable means 31 to the body 19. The intermediate portion of this strap 29 has the offset 32 for receiving a portion of the horizontal bar 8. A clamp plate of U-shape and denoted by numeral 33 is used in complement with the offset portion 32 of the strap 29 and has securing means 34 whereby the clamp plate is secured to the strap and against the horizontal bar 8.

As shown in Figure 1, the usual bicycle seat is dispensed with and a saddle-like structure 35 is mounted on the body 19.

A modification of the invention is shown in Figures 5 and 6 and this consists in dispensing with the handle bars 12 and shank 11 and terminating the barrel 9a within the neck of the body 19. At the upper end of the fork 10a a plate 36 is secured and this has a pair of forwardly diverged arms 37—37, the ends of which have openings therein for receiving the rear ends of the elongated centralizing springs 38—38, the forward ends of which connect to the bridle or bit imitation structure 39 on the head of the horse formed body 19a.

Rings 40 are also disposed through the openings in the outer ends of the arm 37 and rearwardly from these rings extend the reins 41. Obviously, with the use of these arms 37 and these reins 41, the front wheel 13a can be steered without the usual handle bars and the springs 38 will serve to centralize the front wheel 13a in cooperation with the occupant's efforts.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

1. A cycle structure comprising a frame embodying a front barrel, a handle bar shank arising from said barrel, a top bar extending rearwardly from said barrel, a tail bar inclining downwardly and rearwardly from said top bar, and a stub arising from the juncture of said bars, a hollow animal body disposed over said frame, and means to detachably secure said body to said frame comprising a body supporting bar extending transversely of said stub and including a pair of rearwardly diverging arms terminating in right angled ends secured to opposite sides of said body, respectively, a brace bar extending upwardly and rearwardly from said tail bar to said body and detachably secured thereto, a second body supporting bar extending across said top bar adjacent said barrel and having ends secured to the sides of said body, respectively, and a pair of clamping members detachably securing said body supporting bars to said stub and top bar, respectively.

2. A cycle structure comprising a frame, a front steering wheel and a front steering wheel fork, a hollow animal body mounted upon and secured to said frame, a pair of steering arms extending laterally from said fork upon opposite sides thereof, respectively, exteriorly of said body and in front of the breast thereof, a pair of tension springs extending forwardly from the outer ends of said arms to opposite sides of said body to center the steering wheel, and a pair of reins attached to the outer ends of said arms, respectively, for turning the same in opposition to said springs.

LAFAYETTE HARTMAN.